FIG. 1

INVENTOR.
ROGER H. EICHORN

INVENTOR.
ROGER H. EICHORN

FIG. 8

INVENTOR.
ROGER H. EICHORN
BY Donald F. Daley
James P. Schroder
ATTORNEYS

FIG. 9

INVENTOR.
ROGER H. EICHORN
BY
ATTORNEYS

FIG. 10

Sept. 3, 1968  R. H. EICHORN  3,399,610
XEROGRAPHIC APPARATUS

Filed Oct. 22, 1965  10 Sheets-Sheet 9

FIG. 11

INVENTOR.
ROGER H. EICHORN

ATTORNEYS

FIG. 12

INVENTOR.
ROGER H. EICHORN
ATTORNEYS

United States Patent Office 3,399,610
Patented Sept. 3, 1968

3,399,610
XEROGRAPHIC APPARATUS
Roger H. Eichorn, Webster, N.Y., assignor to Xerox Corporation, Rochester, N.Y., a corporation of New York
Filed Oct. 22, 1965, Ser. No. 502,003
3 Claims. (Cl. 95—1.7)

ABSTRACT OF THE DISCLOSURE

Apparatus for xerographically reproducing an original document on a cut sheet of final support material having a paddle wheel developing system and a developed xerographic image is transferred from a photoconductive drum at the 12 o'clock drum position.

---

This invention relates to the field of xerography and particularly to improved automatic xerographic machines.

Xerographic machines presently in commercial use are of either the type that use a rotating drum having a coating of photoconductive material, such as selenium, on which a xerographic powder image is developed and then transferred to a sheet of paper or support material, or the type wherein a photo-conductive material, such as zinc oxide, is coated on the surface of the sheet of paper or support material, and the powder image is developed directly on the final support material. The invention herein pertains to the former type of automatic machine; that is, the type wherein the photoconductive surface is reused to create and develop xerographic images, and the images are transferred to sheets of support material. This type of xerography is conveniently referred to as reusable xerography.

Typical automatic xerographic machines, such as those shown in Hunt et al. Patent No. 3,078,770, issued Feb. 26, 1963, and Mayo et al. Patent No. 3,062,109, issued Nov. 6, 1962, have a rotating xerographic drum which passes a series of processing stations including a charging station, exposure station, a developing station, a transfer station and a plate cleaning station. A uniform electrostatic charge is placed on the surface of the rotating xerographic drum at the charging station, and the plate is then exposed to a light image of copy to be reproduced at the exposure station. After exposure, the photoconductive surface of the rotating drum contains a latent electrostatic image of the copy being reproduced. This latent electrostatic image is developed into a powder image at the developing station wherein electrostatically attractable toner or power material is brought into contact with the surface of the drum so that the powder will adhere to the drum in areas containing the electrostatic charge. The powder image thus developed is transferred to a sheet of support material when the drum rotates to the bottom of its path of travel. As the drum continues to rotate, it is cleaned for reuse at the cleaning station and the cycle is repeated. The transfer of the powder image to the support material surface occurs at the bottom of the xerographic drum surface because of previously inherent limitations in the development process and the sheet handling art.

All commercial reusable xerographic machines utilize a cascade development which is dependent on gravity feed to flow developer material over the surface of the moving xerographic drum. Due to the gravitational feed system of cascade development and the need for the developing material to be moving in the same direction as the surface movement of the xerographic drum, the development system was placed on the side of the xerographic drum, and the developer moved in the same direction as the drum. In order to leave as much as the remaining portion of the xerographic drum for cleaning, charging and exposure, the transfer operation had to be effected at or near the bottom position of the drum. Also, with the transfer station at the bottom of the drum, sheet handling apparatus and techniques could be used which permitted the sheet to be supported from the bottom with the top of the sheet receiving the powder image.

It is therefore an object of this invention to produce xerographic powder images on a reusable drum and to transfer the powder image to a sheet of support material at positions of the drum cycle other than the bottom.

It is an object of this invention to improve automatic xerographic machines to transfer powder images to support material at the top of the xerographic drum cycle.

It is a further object of this invention to simplify and improve automatic xerographic machines.

These and other objects of this invention are attained by means of an arrangement of elements of a xerographic machine wherein the sheet of material to which the powder image is to be transferred is supported from above, and the powder image is transferred to the bottom of the sheet.

For a better understanding of the invention as well as other objects and further features thereof, reference is had to the following detailed description of the invention to be read in connection with the accompanying drawings, wherein:

Figure 1:
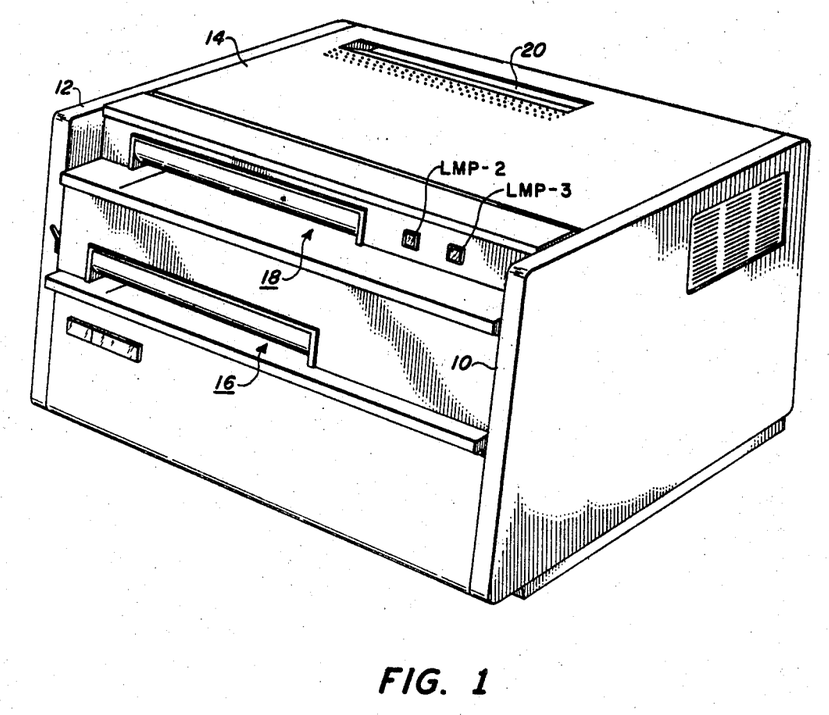
FIG. 1 is a perspective view of a xerographic machine embodying the present invention.

The Xerographic machine shown in FIG. 1 consists of a pair of side covers 10 and 12 and the top cover 14. The front of the machine has an opening 16 to receive an original document to be reproduced, and an opening 18 into which copy paper or support material is fed to receive a powder image. After an image has been transferred to the copy paper, the paper emerges from a slot 20 in the top cover 14.

Figure 2:
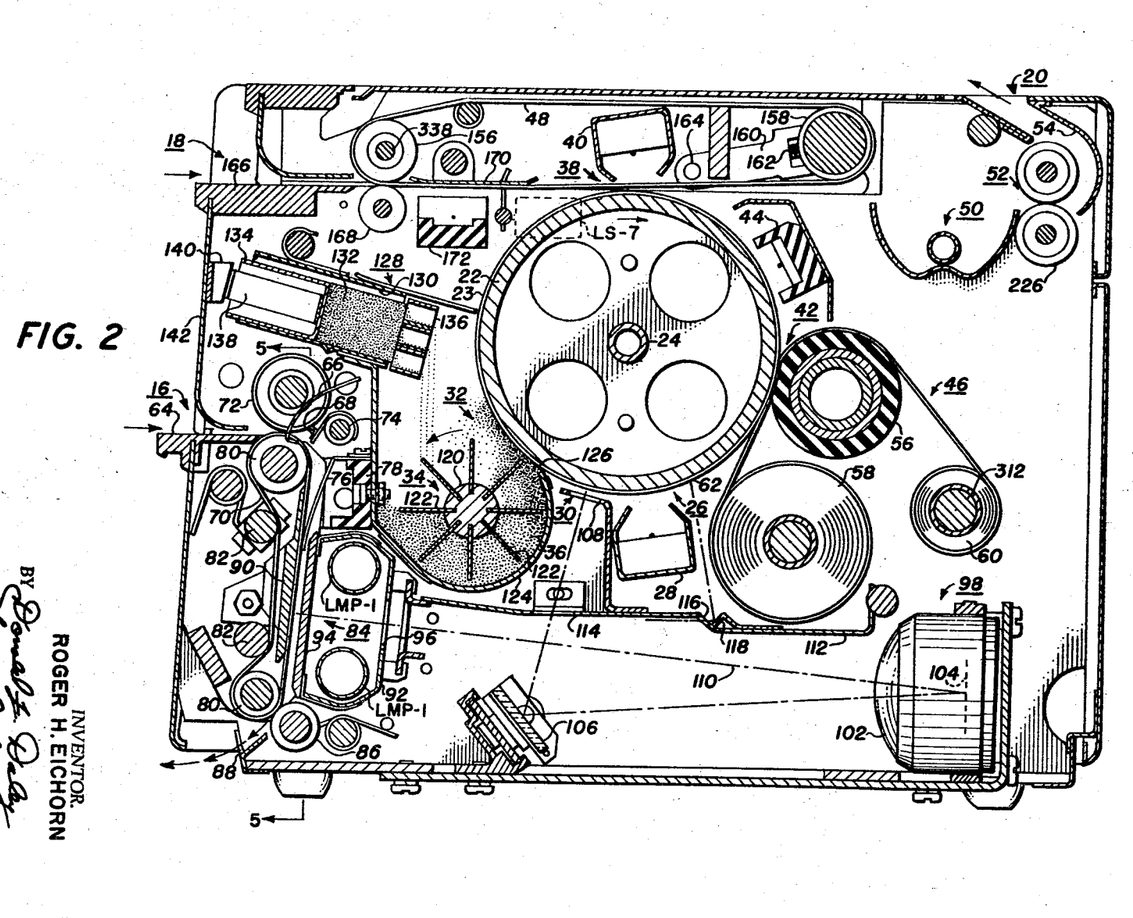
FIG. 2 is a schematic side sectional view of the machine shown in FIG. 1 showing the operation of the machine.

As seen in FIG. 2, a xerographic drum 22 having a layer of photoconductive material 23 about its outer surface is mounted for rotation on a shaft 24. As the drum 22 rotates, it moves past a charging station 26 wherein a uniform electrostatic charge is placed on the photoconductor 23 by means of a corotron 28. The drum then rotates past an exposure station 30 and a developer station 32. At the developer station, 32, a powder image is formed corresponding to a latent electrostatic image created on the drum surface at the exposure station. The light image at exposure station 30 discharges the drum in areas of light and leaves the drum an insulator in areas of darkness thereby creating an electrostatic latent image on the drum surface. As the drum rotates through the developing station 32, a paddle wheel 34 impels developer material 36 against the surface of the drum 22. The developer material is composed of a granulated carrier bead and resinous powder or toner material used to develop the electrostatic images. The toner material is triboelectrically held on the carrier beads and is electrostatically attracted away from the carrier beads to the areas containing the latent electrostatic image, thereby developing a powder image.

The drum continues to rotate past a transfer station 38 having a transfer corotron 40 and a drum cleaning station 42 having a precleaned corotron 44 and a web cleaner 46. The powder image on the drum surface is transferred to a sheet of paper or support material at the transfer station 38. The transfer corotron 40 is positioned to provide an electrostatic charge on the back of a belt 48. The belt 48 is a dielectric material and moves in a continuous loop so that sheets of paper will be carried into contact with the surface of the drum 22. A sheet of paper inserted in the opening 18 is gripped between the belt 48 and a roller. The paper is forced forward past an electrostatic charging device until it trips a switch LS-7. The switch LS-7 turns on the corotron which tacks the paper to the belt. A second or transfer corotron 40 then applies a charge to the back of the belt. The electrostatic charge placed on the back of the belt by the electrostatic charging device or corotron 40 attracts the powder image from the drum surface to the surface of the paper. The paper is then carried forward past a fuser 50 wherein the powder is heated and caused to coalesce and bond to the surface of the paper. The paper is gripped by a pair of ejection rollers 52 and driven forward against a deflection guide 54 which curves the paper upwards and out slot 20 to the top of the machine.

The toner powder used herein has a negative charge relative to the various charges used to create the latent electrostatic images and to transfer the powder from the drum to the support material surface. The latent electrostatic image is created from the positive charge that is placed on the surface of the xerographic drum by the corotron 28. Therefore, the negative charged toner is attracted to the positive latent electrostatic image. At the transfer station, the transfer corotron 40 places another positive charge on the back of the transfer material and the belt 48 so that the negative toner material is then attracted to the surface of support material.

The drum cleaning station 42 has a cleaning roller 56 which forces a web of fibrous material 46 into surface contact with the rotating xerographic drum. The residual powder which has not been transferred to the sheet of paper or support material remains on the drum surface and must be removed prior to the creation of a new image on the surface of the drum. The powder material is held on the drum surface by electrostatic charges which originally were used to create the image and residual electrostatic charges in non-image areas. The effect of these electrostatic charges is neutralized by the use of the preclean corotron 44 which deposits a uniform electrostatic charge of opposite polarity to that holding the toner on the surface of the drum. The fibrous web material 46 is taken from a supply roll 58 around the cleaning roll 56 into contact with the surface 23 of the drum 22 and onto a take-up roll 60. The actuation of the advancing mechanism for the web cleaner is described below. The surface of the xerographic drum is then exposed to a spot of light 62 which discharges the drum surface, removing any residual electrostatic charges which may exist on the drum surface.

The original copy to be reproduced is positioned on a counter 64 and inserted into the document opening or slot 16. The document slides forward, deflecting switch actuator 66 of a limit switch LS-6, until it encounters the document positioning stop 68. With the document abutting against the stop 68, it overlies a feed belt system 70 and is beneath a feed roller 72. When the machine is in operation, as described below, the feed roller 72 comes down on the document, forcing it against the feed belt 70 and driving it forward. The stop 68 which is mounted on a shaft 74 is rotated in a counter-clockwise direction as seen in FIG. 2, deflecting the front end of the document down along the path of the feed belt 70. The belts 70 are constructed of a dielectric material and the document is held in contact with the belts 70 by a row of leaf spring-type guides 76 which extend across the conveyor system. The document is electrostatically tacked to the belt 70 by electrostatic charge applied to the document surface by a corotron 78.

The feed roll belts 70 extend around belt rollers 80 and are held in tension by a pair of guide rollers 82, one of which is adjustable to vary the tension on the belts 70. The documents are carried by the belts 70 past scanning station 84 where they are illuminated by a pair of lamps LMP-1. The documents are carried down between the belts 70 and a lower roller 86 at the same speed as the surface of the xerographic drum and then ejected through a slot 88 at the bottom front of the machine. The belts 70 and the documents held thereon are flat against a backup platen 90 at the scanning station. The backup platen 90 is white at the scanning station to reflect any light passing through the document back through the document to the xerographic drum 22. The lamps LMP-1 are housed in a housing 92 and shielded from the document by a transparent plate 94.

An optical image of the illuminated portion of the document at the exposure station 84 passes through the transparent plate 94, through an opening 96 in the lamp housing 92 to a combination mirror-lens assembly 98. The latent image passes through the lens 102 and is reflected by a mirror surface 104 back through the lens 102 to a mirror 106. The lens 102 focuses the image so that the image is properly focused on the drum surface 22 when it is reflected by the mirror 106 through the exposure slit 108 at exposure station 30 to the drum surface 22. The light path of the optical image is indicated generally by the dotted line 110.

The xerographic mechanism is shielded from the ambient light produced by the exposure system by means of a shield 112. The light shield 112 has an opening 114 positioned between the mirror 106 and the exposure slit 108 to allow passage of the light image to the drum surface. There is also an opening 116 in the light shield 112 which permits some of the ambient light to pass through the shield and be reflected by a reflective surface 118 to the drum to produce the discharge spot 62. The light of the discharge spot 62 removes any residual charge remaining on the drum surface after drum cleaning by rendering the photoconductive surface conductive and draining off any remaining charge.

Figure 3:
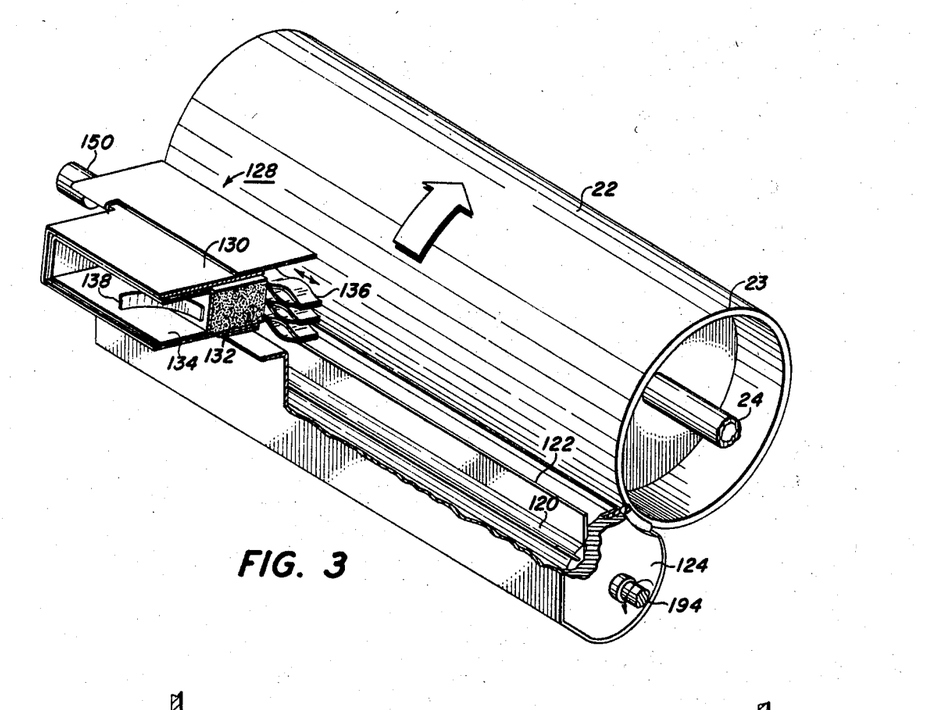
FIG. 3 is a perspective view of the xerographic drum, developer unit and toner dispenser of the xerographic machine shown in FIG. 1, with portions broken away to show internal construction.

The development system used to develop the latent electrostatic images on the side of the drum which is moving from bottom to top is a paddle wheel developer. A rotatable shaft 120 having a series of paddles 122 extending outward from the periphery thereof constitutes the paddle wheel 34. The paddle wheel 34 extends across the length of the drum 23 and is contained within the developer housing 124. The developer housing 124 extends from a point just past the exposure station 30 in the direction of movement of the drum to a point further along in the direction of rotation of the drum. The housing is shaped to contain a quantity of developer material 36 in contact with the paddle wheel 34. A developer 36 consists of carrier beads and toner particles intimately mixed so that a triboelectric charge causes the toner particles to adhere to the carrier beads. As the paddle wheel 34 rotates in the direction indicated by the arrow, the developer material is hurled or thrown by the paddles 122 upwards against the surface 22 of the drum 23. Developer is prevented from passing between the drum surface and edge of the developer housing 124 by means of a drum seal 126. The seal 126 consists of a piece of Mylar mounted on the edge of the housing 124 in contact with the surface of the xerographic drum.

As the developer encounters the surface of the drum, portions of the toner material are jarred loose from the carrier beads and are attracted by electrostatic charges on the drum surface. The electrostatic charges on the drum surface define the images to be reproduced, and thus the powder particles held on the drum surface by the electrostatic charge are in image configuration. The carrier beads continue upward in their path of travel and eventually fall back into the lower portion of the developer housing 124 to be remixed with the main body of developer material. As toner particles are removed by the electrostatic charge on the drum surface, additional toner must be added to the main body of developer material. A toner dispenser 128 is mounted in the top of the developer housing 124 for the purpose of supplying additional toner material as needed. The toner dispenser 128 consists of a container portion 130 adapted to hold solid blocks of toner material 132, a pressure cap 134 and a scraping blade 136. The blocks of toner 132 are placed in the container 130 with one edge against the blades 136. The cap 134 is also placed inside the container 130 against the blocks 132 and is held in place and forced forward by a series of leaf springs 138. The leaf springs 138 are mounted on brackets 140 on the front cover 142 of the apparatus. As the cover 142 is closed, the leaf spring 140 is forced against the cap 134 urging the solid blocks of toner 132 against the blades 136.

Figure 4:
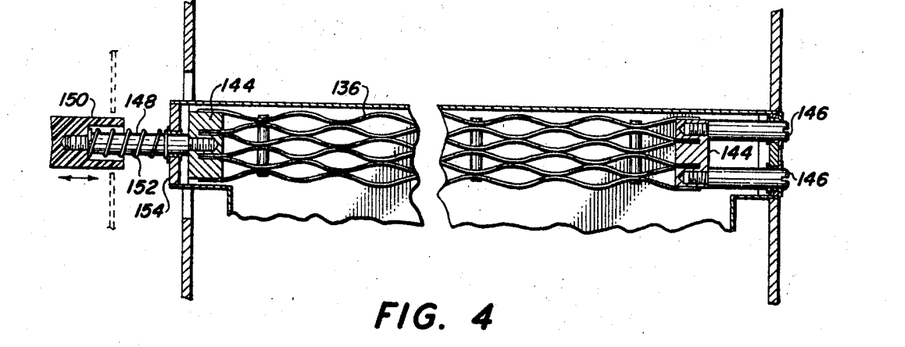
FIG. 4 is a front view of the toner dispenser shown in FIG. 3.

Operation of the toner dispenser can best be seen in FIGS. 3 and 4. The blades 136 are similar to hack saw blades bent in a honeycomb configuration to insure complete coverage of the surface of the toner blocks and mounted in a pair of end blocks 144. The end blocks 144 are supported in the machine frame plate by means of a pair of sliding pins 146 at one end and a single pin number 148 at the other end. The pin 148 has a button or cap 150 mounted on one end so that it extends outside of the entire machine. A compression spring 152 is mounted on the shaft 148 between the cap 150 and a bearing plate 154. Pressure on the cap 152 forces the pin 148 and the blades 136 forward against the action of the spring 152. The movement of the blades 136 across the surface of the block 132 produces a scraping action which removes portions of the toner material from the block which then fall into the bottom of the developer housing 124. When the cap 150 is released, the spring 152 returns the springs 136 to their original position again producing a scraping action on the surface of the blocks 132 and removing toner therefrom.

A conveyor belt 48 is positioned to carry a sheet of paper from the copy paper opening 18 into contact with the xerographic drum 23 and then to the fuser 50 and ejection rollers 52. The belt 48 extends around a roller 156 just inside the copy paper opening 18 and a spring loaded tensioning roller 158 positioned just ahead of the heat fuser 50. As the belt extends between the rollers 156 and 158, the bottom surface thereof is in contact with the top of the xerographic drum 23. The roller 158 is journaled in a bifurcated member 160 and is spring loaded by compression spring 162. The bifurcated member 160 is mounted on and pivoted about a shaft 164 so that rotation of the shaft 164, as described below, will elevate the roller 158 and the belt system 148 away from the drum 23. When a sheet of paper is inserted in the opening 18 on counter 166, it slides forward until it is gripped between a pressure roller 168 and the belt 48 at roller 156. The paper is carried forward in contact with the belt to a point just beyond an electrostatic discharge member or corotron 172. The belt 48 is held flat at this point by a guide 170 mounted against the inside surface of the belt. The corotron 172 is energized when the paper hits switch LS–7 and placed an electrostatic charge on the paper surface, in this case, a positive charge, causing the paper to adhere to the belt. The electrostatic attraction between the paper and the belt causes the paper to be carried forward with the belt into surface contact with the xerographic drum. When the paper has been in contact with the xerographic drum and had a powder image transferred thereto, it is carried forward to the heat fuser 50 and is separated from the belt 48 by the sharpness of the angle that the belt takes around the roller 158. The sharpness of the angle and the natural rigidity of the paper are sufficient to overcome the electrostatic attraction between the belt and the paper, and thus the paper continues forward while the belt is directed around the roller 158.

The transfer corotron 40 mounted above the belt 48 at the top of the drum or transfer point 38 is tilted at a slight angle such that the electrostatic charges are placed on the belt directly above the transfer point and not preceding the transfer point. When the electrostatic charge is placed on the belt slightly before the transfer point, the electrostatic image on the drum surface tends to produce an arc between the drum and the belt; and the powder image on the drum surface is disrupted or destroyed. Tilting the transfer corotron 40 in the manner shown in FIG. 2 eliminates the arcing prior to the transfer process.

Operation

Figure 7:
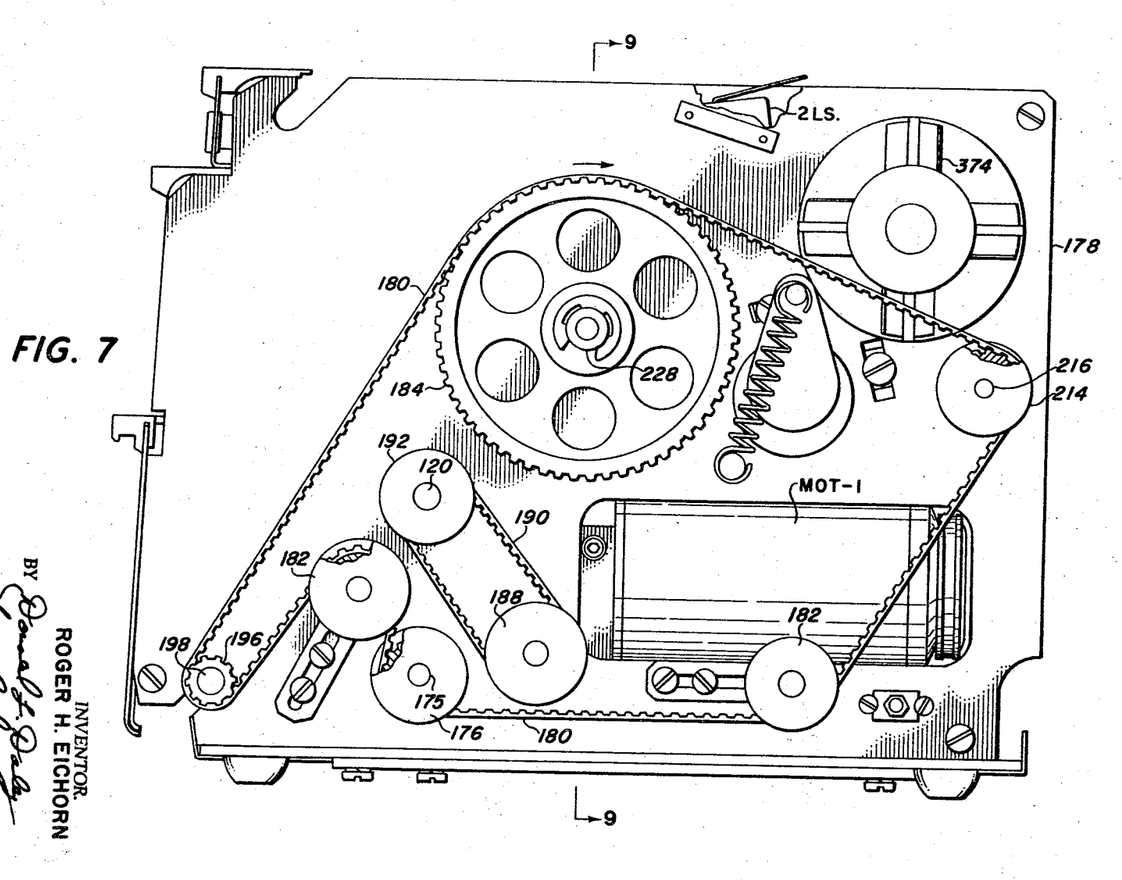
FIG. 7 is a right-hand side view of the apparatus shown in FIG. 1 with the outside cover removed.
Figure 8:
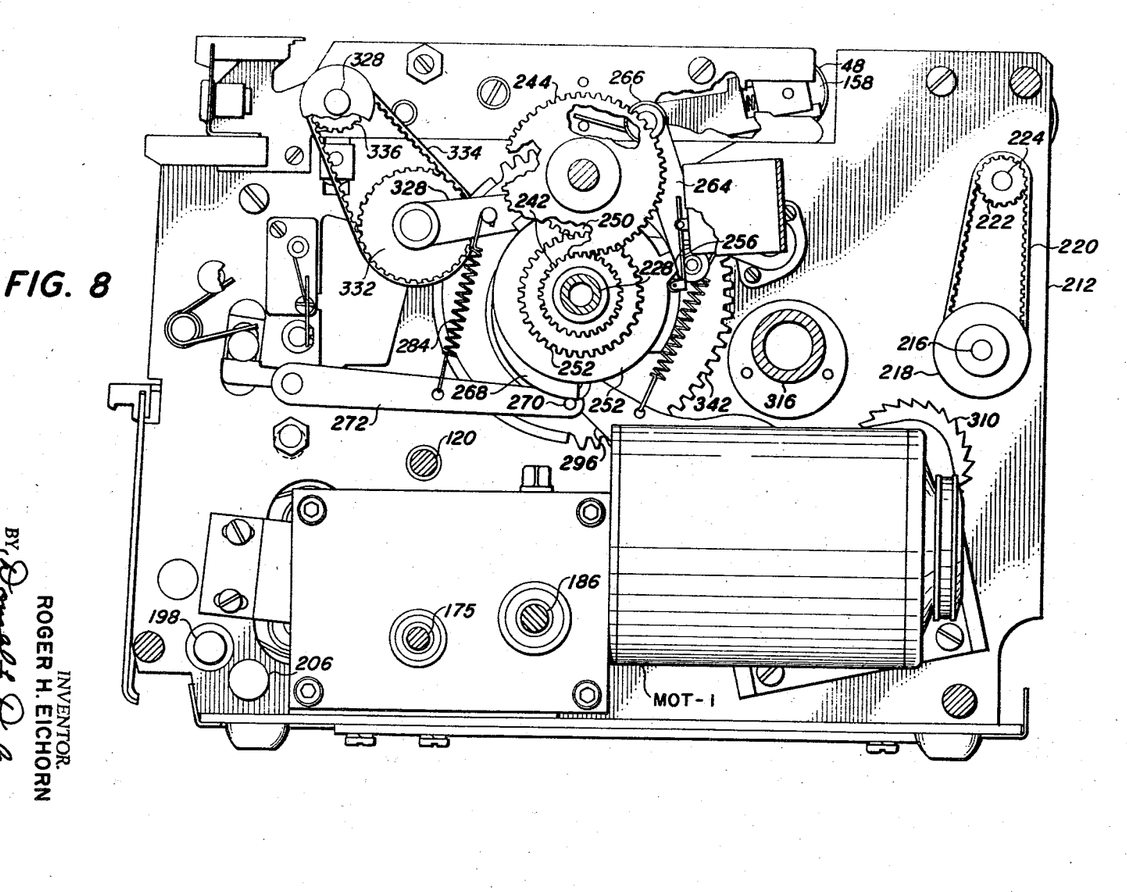
FIG. 8 is a right-hand sectional view taken along lines 8—8 shown in FIG. 9.
Figure 9:
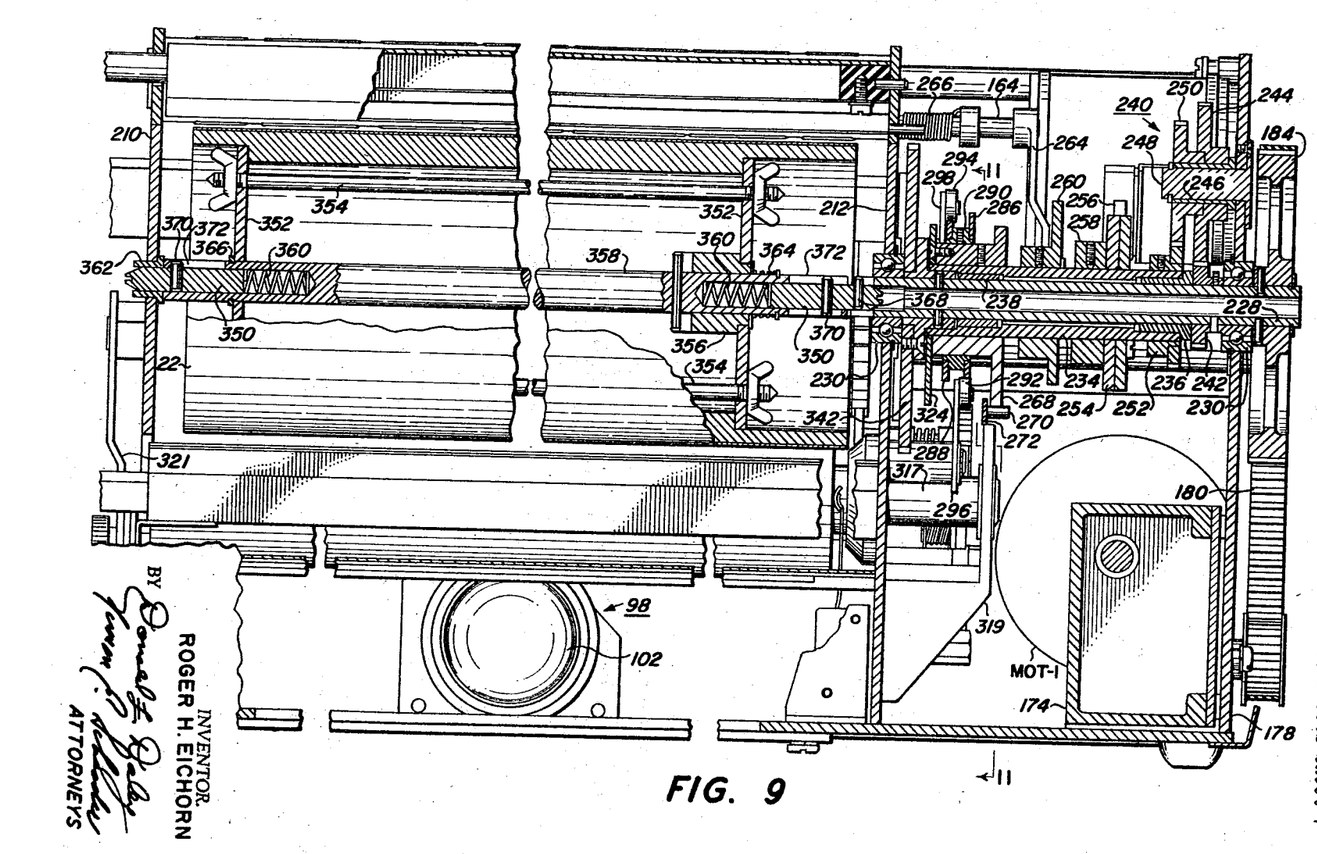
FIG. 9 is a front sectional view taken along lines 9—9 of FIG. 7.

The apparatus is driven by a motor MOT–1, as seen in FIGS. 7 through 9, through a gear box 174 to a main drive shaft 175. The drive shaft 175 extends outward from the gear box 174 through a side frame plate 178 and has a pulley 176 mounted thereon. The pulley 178 drives a timing belt 180 which extends around tensioning idling pulleys 182 to a drum drive pulley 184.

A second drive shaft 26 also extends out of the gear box 174 through the side frame 178 terminating in pulley 188. The pulley 188 drives a timing belt 190 which extends around a pulley 192 on the developer drive shaft 120. The shaft 120 extends through the developer housing 124 and supports the paddle blades 122 in the developer housing.

Figures 5, 6:
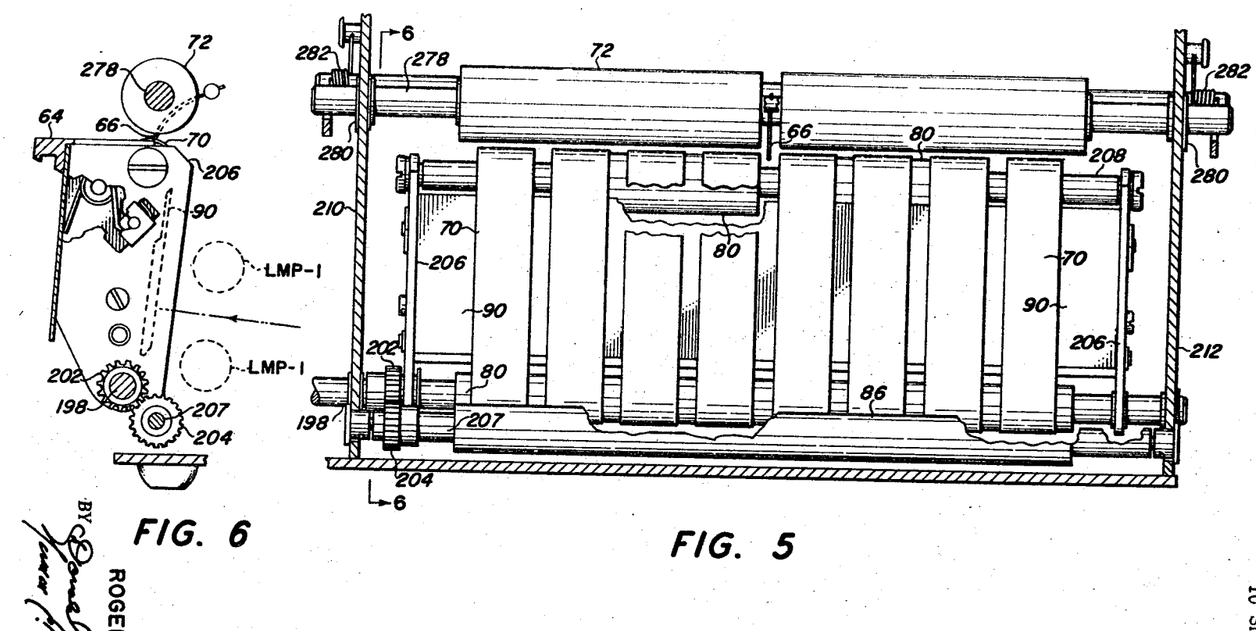
FIG. 5 is a rear view of the document conveyor taken along lines 5—5 of FIG. 2 with portions broken away to show internal construction.
FIG. 6 is a side view of the document conveyor taken along lines 6—6 of FIG. 5.

A pulley 196 mounted on a shaft 198 is driven by the main drive belt 180 and drives the document conveyor belt 70. The shaft 198 supports the lower belt roller 80 of the document conveyor. A gear 202 mounted on the shaft 198 drives a gear 204 on the shaft 207 of the roller 86. As seen in FIG. 5, the shaft 198 also supports a pair of platen support members 206. The platen support members 206 support and position the backup platen 90 and also provides support for the shaft 208 of the other belt roller 80. Both shafts 198 and 207 are journaled in a second side frame 210 and an intermediate support frame member 212.

The final pulley 214 driven by the timing belt 180 is mounted on an intermediate shaft 216 supported between the side frame plates 178 and the intermediate frame plate 212. Power is transmitted from the belt 180 to the pulley 214 to the shaft 216 and then to a pulley 218 also mounted on the shaft 216 and driving a belt 220. The belt 220 drives another pulley 222 on the shaft 224 of the roller 226 of the ejection rollers 52. Therefore, when the main drive motor MOT–1 is running, the timing belt 180, the drum drive pulley 184, the document conveyor, and the ejection rollers 52 are all being driven. Operation of the main drive motor MOT–1 also effects operation of the developer paddles 122.

The drum drive pulley 184 is mounted on a hollow shaft 228, journaled in bearings 230 in the side frame 178 and the intermediate support frame 212. The shaft 228 is releasably connected to the xerographic drum shaft 232 and transmits rotational movement from the pulley 184 to the drum 22. The shaft 228 also supports a torque tube 234. The torque tube 234 is mounted on the shaft 228 by means of a pair of bearings 236 and 238. The torque tube 234 is driven from the shaft 228 by a gear train indicated generally as 240 and consisting of a first gear 242 secured to the shaft 228 and meshing with a larger gear 244 mounted on and secured to a rotatable bearing 246 on a stub shaft 248 extending inwardly from the side frame plate 178. The gear 244 produces rotation of the bearing 246 and a smaller gear 250. The gear 250 meshes with gear 252 secured to the torque tube 234. The transmission of power from the shaft 228 through the gear train 240 to the torque tube 234 produces rotation of the torque tube at a rate that is one-half of the rotational movement of the xerographic drum 22. That is, the shaft 228 rotates through two complete revolutions as the torque tube 234 rotates through one complete revolution.

The torque tube 234 supports a series of cams used to control the operation of the various components of the machine. A double cam 254 is used to actuate a switch arm 256 for switch LS–5. The cams 254 may be adjusted by rotating the cams relative to each other to vary the timing of the operation of the switch LS–5. The cams 254 are secured to the torque tube 234 by means of a hub 258. A second cam 260 is also mounted on the torque tube 234 and operates a follower 262 on arm 264. The arm 264 is secured to shaft 164. The cam 260 produces a turning motion of the arm 264 which in turn rotates the shaft 164 against the action of torsion spring 266 and raises the roller 158 of the document conveyor. Rotation of the shaft 164 produces a rotational movement of the bifurcated member 160 supporting the member 158 so that the belts 48 are moved away from the xerographic drum 22.

The document feed roller 72 is controlled by a cam 268 mounted on the torque tube 234 and designed to move follower 270 on arm 272. The arm 272 rotates a stub shaft 274 which has a second arm 276 connected thereto. The arm 276 bears against the shaft 278 and produces movement of the shaft in slots 280 in the side frame 210 and the intermediate support frame 212. The shaft 280 is the support shaft for the document feed roller 72. As seen in FIGS. 5 and 8, the shaft 278 is urged in a downward direction by a pair of torsion springs 282, urging the roller 72 into driving contact with the belts 70 of the document conveyor. The rotational movement of the cam 68 forces the follower 270 and the arm 272 downward, pivoting the arm 276 upward urging the shaft 278 against the action of the springs 282 and separating the roller 72 from the belt 70. A tension spring 284 urges the follower arm 272 in a direction opposite to the movement produced by the cam 268.

Figure 11:
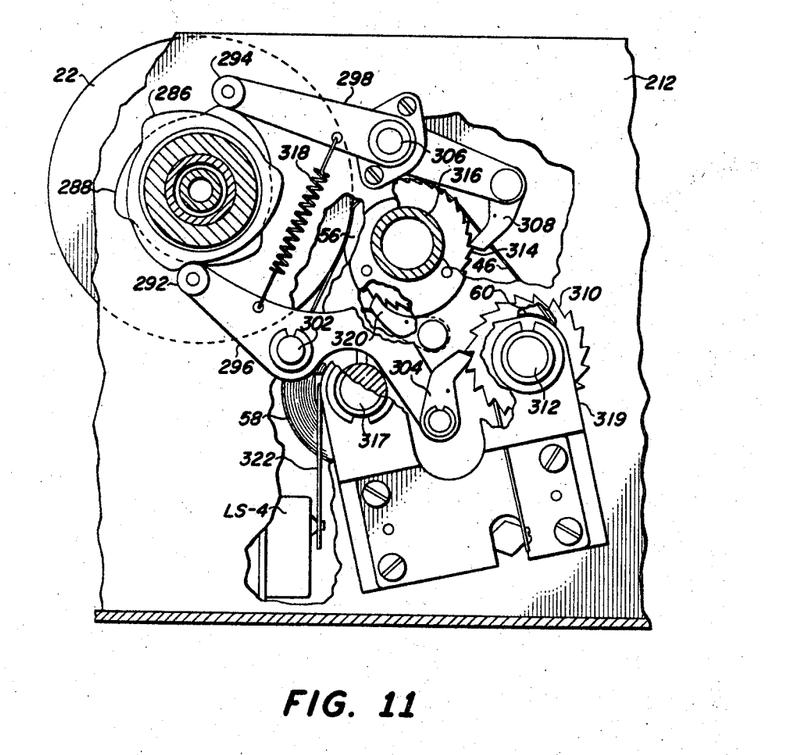
FIG. 11 is a right-hand sectional view of the web cleaning apparatus taken along lines 11—11 of FIG. 9.

A pair of cams 286 and 288 are secured to a mounting ring 290 on the hub of the cam 268 which in turn is supported from the torque tube 234. A pair of followers 292 and 294 engage the cams 286 and 288, respectively, and move follower arm 296 and 298, respectively. The cams, followers and arms provide the operation and control of the web cleaner 46. As seen in FIG. 11, the follower arm 296 pivots about a shaft 302 and actuates a pawl 304. The follower arm 298 pivots about a shaft 306 and actuates pawl 308. The pawl 304 actuates a ratchet wheel 310 mounted on the shaft 312 which supports the web take-up roll 360. The pawl 308 actuates the ratchet wheel 314 mounted on the front shaft 316 which supports the cleaning roller 56. The two follower arms 296 and 298 are urged towards each other so that the followers 292 and 294 ride on the cams 286 and 288 by a tension spring 318. Each of the cams has three lobes or rises which are spaced equal distances about the periphery of the cam. The rises on each cam are staggered with the rises on the other cam so that when one follower is at an elevated position, the other follower is at a depressed position. As the machine rotates, cam 288 elevates the follower 294 and arm 298 so that the pawl 308 actuates the ratchet wheel 314. The ratchet wheel 314 turns the shaft 316 and the cleaning roller 56 so that new web material is advanced from the supply roll 58 into surface contact with the xerographic drum 22. A small pawl 320 also cooperates with the ratchet wheel 314 to prevent movement of the cleaning roll 56 by the xerographic drum 22.

Continued operation of the machine causes the cam 286 to actuate the follower arm 296 and pawl 304 so that the ratchet wheel 310 is advanced one position moving the shaft 312 and the take-up roll 60. This process is repeated three times for each revolution of the torque tube 234. Since the torque tube 234 revolves ½ revolutions for every revolution of the xerographic drum, 22, the web material 46 is advanced three times for each revolution of the torque tube. A switch LS–4 having an actuating arm 322 which bears against the side of the supply roll 58 indicates when there is a low supply of web material. The actuating arm 322 is biased against the side of the web material; and when the web material has been depleted from the supply roll 58 to a point sufficient to allow the arm 322 to pass, the switch LS–4 is actuated, illuminating lamp LMP–1 on the control panel as seen in FIG. 1. The lamp LMP–1 indicates to the operator that the cleaning web should be replaced.

The take-up roll shaft 312 and the supply roll shaft 313 are supported from the intermediate frame plate 212 and a support frame member 319 seen in FIG. 9. The two shafts are supported from the two support members in cantilever fashion so that rolls of web material may be placed on and taken off of their rolls respectively from the opposite side of the machine. The cleaning roll shaft 316 is supported from the intermediate frame plate 212 and the side frame plate 178 and at the opposite end by means of a repivotable support member 321 which holds the end of the roll during operation and is removable therefrom for purposes of changing the supply of web material. The cleaning roller 56 is pivotable away from the drum so that the web may be inserted between the roller and the drum surface.

The last cam 324, driven by the torque tube 234, is connected to the hub of the cam 268 and regulates the operation of the copy paper pinch roller 168. The operation of the cam 324 and its associated follower 326 and the follower arm 328 can best be seen in FIG. 10. The arm 328 is secured to stub shaft 330 which is rotatably mounted in the intermediate support frame 212. The shaft 330 also suports sprocket 332 which drives the electrostatic conveyor 48 by means of timing belts 334 which extend around the sprocket 332 and a second sprocket 336. The second sprocket 336 is mounted on shaft 338 which supports the roller 156. Roller 156 drives the belts 48 of the electrostatic conveyor. The sprocket 332 is driven by means of a smaller gear 340 secured to the sprocket 332 and positioned to engage the segmented gear 342 mounted on the shaft 228. The gear 340 has a positioning member 344 which mates with and permits passage of the portion of the segmented gear which does not have teeth. The member 344 also prevents rotation of the gear 340 during the time it is not meshed with the teeth of the segmented gear 342, thus the conveyor belt 48 cannot be driven during the portion of the cycle in which the teeth of the segmented gear do not mesh with the teeth of the gear 340.

Figure 10:
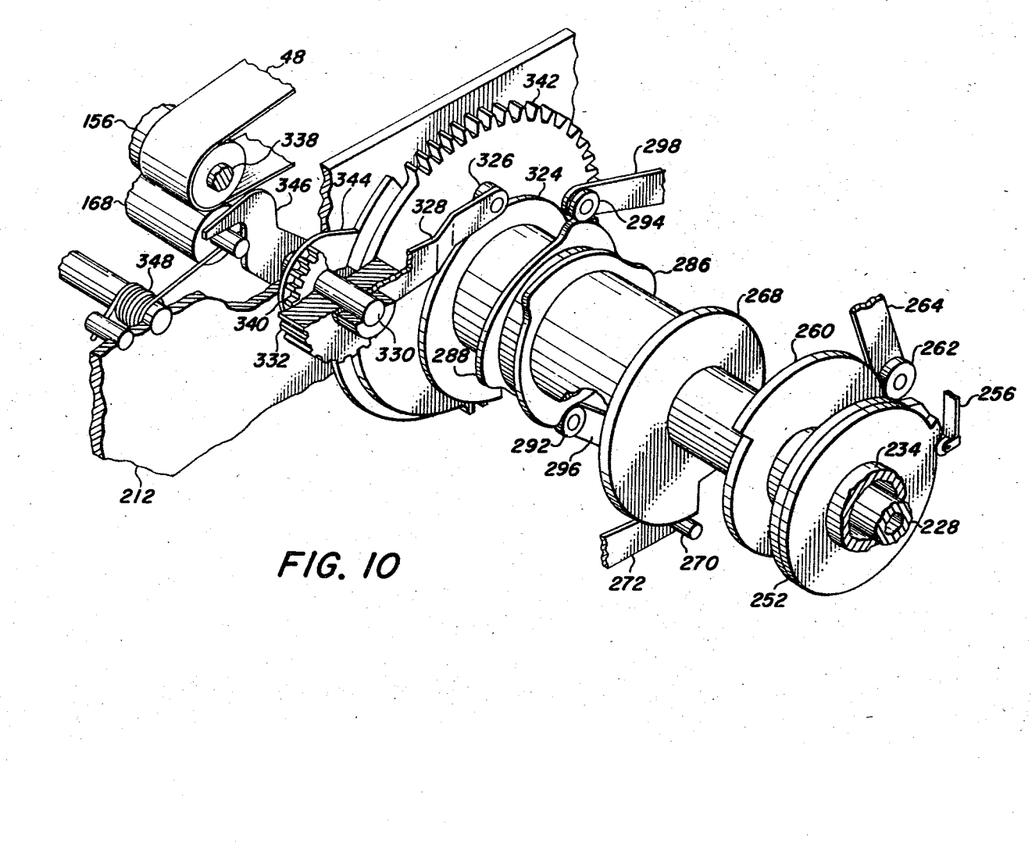
FIG. 10 is a perspective view of the main drive shaft and control elements shown in FIG. 9.

When a sheet of copy paper is inserted into the opening 18, the roller 168 is held separated from the roller 156 and belt 148 by an arm 340 mounted on shaft 330 as seen in FIG. 10. The arm 346 is actuated by the cam 324 through the follower arm 328 and forces the follower 168 downward against the action of spring 348. When a switch LS-7 is stripped by the copy paper, the drive motor is energized as explained below; and the cam 324 is rotated, raising the arm 346 and permitting the spring 348 to force the roller 168 into driving contact with the belt 48. At the same time, the corotron 172 is energized, electrostatically tacking the copy paper to the belts 48; and the segmented gear 348 rotates to a position wherein the teeth of the gear mesh with the gear 340; and the positioning member 344 permits rotation of the gear 340 so that the belt system is driven through the sprocket 332, belt 334 and sprocket 336 on shaft 338.

The main drive shaft 228 supports the xerographic drum 22 by means of a pair of rotatable plugs 350. The shaft 228 is hollow so that a screw driver may be inserted through the length of the shaft and into the slotted head of one of the plugs 350. The slotted head of the other plug 350 is also accessible to a screw driver. The drum 22 is hollow and adapted to receive a pair of end plates 352. The end plates are held in the drum by means of tie rods 354. A bearing 356 is mounted in one end plate 352 and supports a shaft 358 which extends through the center of the drum and is also journaled in the opposite end plate 352. The shaft 358 is drilled at each end to receive the plugs 350 and compression springs 360. With the plugs 350 inserted into the end of the shaft 358, the drum assembly may be supported by one plug resting in the opening of the shaft 228; and the other plug resting in a bearing 362 in the side frame member. A compression spring 364 mounted around the shaft 358 biases the entire drum assembly towards the left-hand frame member 210 so that the end plate 352 abuts a retaining ring 366 mounted on the shaft 358, thus insuring the proper position of the xerographic drum 22. A pin 368 extends through an opening in the shaft 228 into the plug 350 so that the shaft 358 and the drum assembly 22 rotates with the shaft 228. To remove the drum from the machine, a pair of screw drivers are placed in the slotted ends of the plugs 350; and the plugs are forced inward against the action of springs 360 and rotated 90°. A pin 370 in each of the plugs 360 mate with slotted openings 372 in the shaft 358 to permit longitudinal movement of the plugs 350. The rotational movement of the plugs 350 is accomplished by extensions of the opening 372 extending around the circumference of the shaft 358. The openings 372 are in effect L-shaped so that when the plugs 350 are rotated 90°, the pins 370 hold the plugs in against the action of springs 360, thus allowing the drum 22 to be removed from the apparatus.

Figure 12:
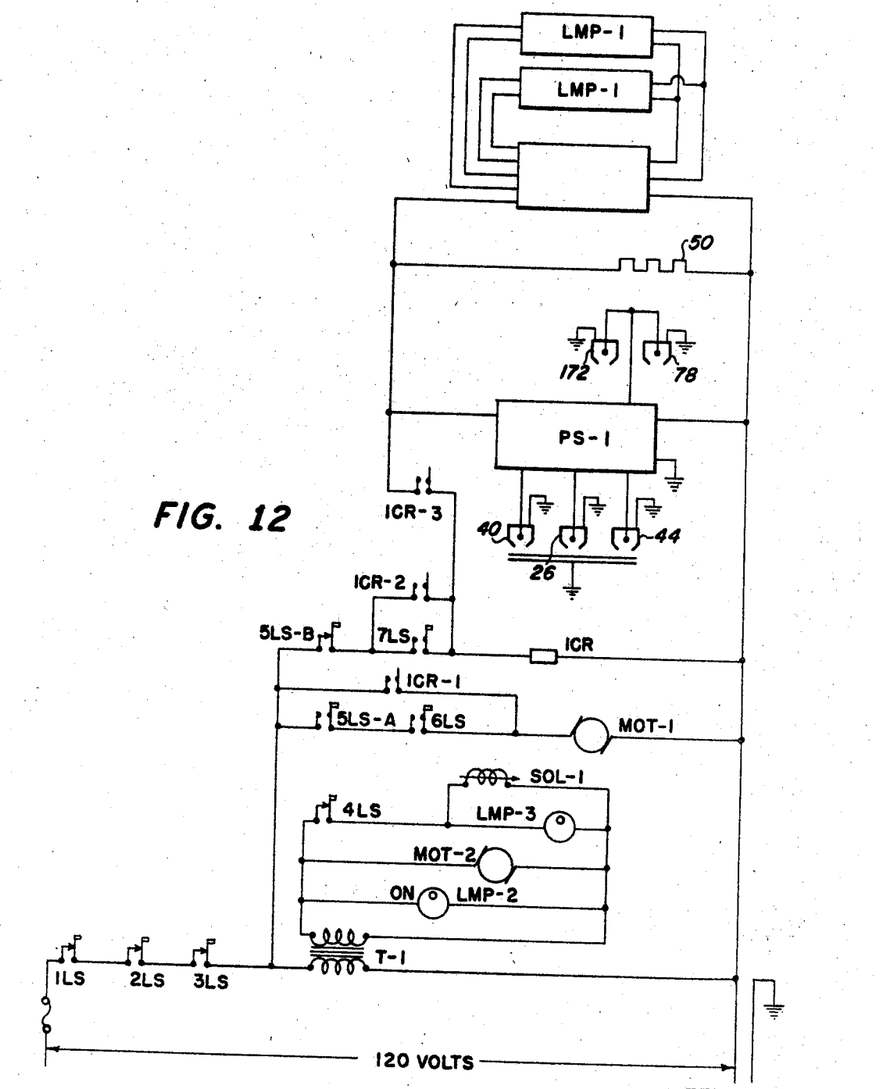
FIG. 12 is a schematic wiring diagram of the apparatus shown in FIG. 1.

FIG. 12 shows a schematic wiring diagram on the apparatus. The machine operates on a 120-volt circuit and has three interlock switches 1LS, 2LS and 3LS on the rear, top and front of the machine, respectively, to insure that the covers of the machine are in place and closed before the machine is operated. The switch 2LS can be seen in FIG. 7 at the top of the machine. With the covers in place and the limiting switches 1LS, 2LS and 3LS closed, a transformer T-1 is energized, providing power to a 28-volt circuit. Therefore, when the machine is first plugged in and power supplied to the transformer T-1, a lamp LMP-2 is illuminated on the front of the machine and indicates that the machine is on. A motor MOT-2 is also energized and drives a blower 374, seen in FIG. 7. The blower 374 exhausts air from the machine and keeps the apparatus cool. A set of normally closed contacts 4LS, corresponding to the limit switch LS-4 located adjacent to the web cleaner supply roll, control the operation of the low web indicator lamp LMP-1 and a solenoid SOL-1 which operates a buzzer which also indicates that the supply of web cleaning material is low. The contacts 4LS are held in the open position by the arm 322 of the switch LS-4 when the arm bears against the side of the web cleaning supply roll.

The main drive motor MOT-1 is controlled by two normally open sets of contacts 5LS-A and 6LS. The contacts 5LS-A are associated with the switch LS-5 actuated by the cam 254 on the main drive shaft 228. When the cam 254 actuates the switch LS-5, the contacts 5LS-A close. When a document is inserted into the opening 16, actuating arm 66 and associated switch LS-6, the contacts 6LS also close, energizing the motor MOT-1 so that the document is advanced into contact with the stop 68; and the cam 254 is rotated releasing the switch LS-5. Release of the switch LS-5 cuts off the motor MOT-1 and also permits closing of contacts 5LS-B which had been held open during the actuation of the motor MOT-1. Closing of the contacts 5LS-B permits relay 1CR to be energized when the switch LS-7 is energized by the copy paper being inserted in the opening 18. Energization of the switch LS-7 closes the contacts 7LS, energizing the relay 1CR. The relay 1CR's first set on contacts, 1CR-1, again energize the motor MOT-1 driving the entire apparatus; and the contacts 1CR-2 and 1CR-3 are also closed. The contacts 1CR-2 bypass the copy contacts 7LS of the copy sensing switch LS-7 so that the relay 1CR will remain energized after the copy paper has passed the actuating arm of the switch LS-7. The contacts 1CR-3 permit power to the power supply PS-1 which energizes each of the corotrons 40, 26 and 44. The power supply PS-1 also provides for energization of the corotron 172 which is used to electrostatically tack the paper to the conveyor belt 48.

At the same time that the power supply PS-1 is energized, the fuser 50 is also energized; and the illuminating lamps LMP-1 are turned on, illuminating the document in the exposure station 84. When the copy paper has released the switch 7LS and the cam 252 has completed a revolution and again actuated switch LS-5, the contacts 5LS-B open; and the relay 1CR is de-energized, stopping the motor MOT-1 and turning off the power suply PS-1 the fuser 50 and the lamps LMP-1. The machine is then again in a position to be used to reproduce other copies. The length of time for the cam 254 to return to its original position and actuate the switch LS-5 is long enough for the document paper to be carried out the bottom opening 88 by the conveyor belts 70 and the roller 86 and also for the copy paper to be carried past the fuser 50 through the discharge rollers 52 and out the slot onto the top of the machine.

While the invention has been described with reference to the structure disclosed herein, it is not confined to the details set forth; and this application is intended to cover such modifications or changes as may come within the purposes of the improvements or the scope of the following claims.

What is claimed is:
1. Apparatus for producing copies of an original document on cut sheets of a final support material of the type wherein the surface of a rotating xerographic drum is charged uniformly and the drum then passed to a scanning station where it is exposed to a light image of an original document to form a latent image thereon, the apparatus including:
   document transport means for moving the original document past the scanning station at a predetermined rate whereby a latent image is formed on the rotating drum,
   developing means having a paddle wheel impeller positioned therein with the impeller blades partially immersed in developer material and being arranged to impel developer material against the bottom of the drum surface to develop a latent image thereon,
   transfer means positioned at the top of the drum and having an electrostatic belt being adapted to convey cut sheets of a final support material into contact with the top of the drum surface and having further means to attract the developer material from the drum surface to the final support material,
   drive means associated with said document transport means and the final support conveyor being adapted to regulate the movement of the transport and the conveyor in timed relation with the movement of the drum surface, circuit means to control the movement of the document transport and the electrostatic belt conveyor including a first switching means positioned in the scanning station and being operable by a document positioned therein so as to condition the electrostatic conveyor to advance a copy sheet, and a second switching means in said transfer means and being operable by a copy sheet positioned therein to activate said drive means.

2. A xerographic reproducing apparatus including:

a xerographic drum having a photoconductive surface and being journaled for rotation through a series of processing stations, drive means to rotate said xerographic drum, electrostatic charging device positioned adjacent the drum surface to place a uniform electrostatic charge on the surface of said drum, exposure means being arranged to expose the bottom portion of the xerographic drum to a light image of a document to be reproduced so as to form a latent electrostatic image of the original document on the xerographic drum, developing means having a housing adapted to hold a quantity of xerographic developer material and having a paddle wheel impeller therein with the impeller blades partially immersed in developer material and arranged to impel developer material against the bottom surface of the xerographic drum whereby the latent image is developed, transfer means positioned at the top of the drum to transfer a developed image from the drum surface to a cut sheet of support material, said transfer means comprising an electrostatic belt conveyor adapted to convey a cut sheet of copy paper into contact with the top of the drum surface and means to attract a powder image from the drum surface to the copy sheet surface, and control means associated with said transfer means to regulate the movement of a sheet of copy paper in timed relation with the movement of the xerographic drum whereby the developed image is transferred in registration with the cut sheet of copy paper.

3. Xerographic apparatus for producing powder images on a cut sheet of final support material including:

a xerographic drum journaled for rotation, means to electrostatically charge the drum surface and optical system adapted to transmit a light image of an original document to be reproduced from a scanning station to the drum surface, a document conveyor means associated with the scanning station and being adapted to carry an original document past said optical system in a predetermined timed relation to the movement of the drum whereby a latent image is formed on said drum surface, developing means being arranged to develop the latent image on the bottom portion of the drum surface, an electrostatic sheet conveyor positioned to receive a cut sheet of support material and to move said support material into and out of contact with the top of the rotating xerographic drum, an electrostatic discharge device positioned behind said conveyor to attract powder from the drum surface onto the surface of the support material, means to drive the drum, the document conveyor, and the sheet conveyor in timed relation such that a developed powder image is placed on a cut sheet of support material in registration, and circuit means associated with said drive means, said circuit means being operable by a document positioned in the document conveyor and a sheet positioned in said electrostatic sheet conveyor to actuate said drive means.

References Cited

UNITED STATES PATENTS

| | | | |
|---|---|---|---|
| 3,008,826 | 11/1961 | Mott | 95—1.7 X |
| 3,093,039 | 6/1963 | Rheinfrank | 95—1.7 |
| 3,146,688 | 9/1964 | Clark | 95—1.7 |
| 3,309,960 | 3/1967 | Delplanque | 95—1.7 |

JOHN M. HORAN, *Primary Examiner.*